(12) United States Patent
Schmidt et al.

(10) Patent No.: US 8,481,633 B2
(45) Date of Patent: Jul. 9, 2013

(54) RUBBER MIXTURE COMPRISING PRECIPITATED SILICIC ACID

(75) Inventors: Carmen Schmidt, Hannover (DE); Carla Recker, Hannover (DE); Thomas Fey, Bad Arolsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 184 days.

(21) Appl. No.: 12/923,744

(22) Filed: Oct. 6, 2010

(65) Prior Publication Data
US 2011/0065833 A1 Mar. 17, 2011

Related U.S. Application Data

(63) Continuation of application No. PCT/EP2009/051829, filed on Feb. 17, 2009.

(30) Foreign Application Priority Data
Apr. 7, 2008 (DE) .................. 10 2008 017 731

(51) Int. Cl.
C08K 3/34 (2006.01)
C08L 9/00 (2006.01)

(52) U.S. Cl.
USPC ......................................... 524/492; 524/572

(58) Field of Classification Search
USPC ....................................................... 524/492
See application file for complete search history.

(56) References Cited

U.S. PATENT DOCUMENTS

| | | | |
|---|---|---|---|
| 4,094,771 A | 6/1978 | Brandt et al. | |
| 5,403,570 A | 4/1995 | Chevallier et al. | |
| 5,846,311 A | 12/1998 | Bomal et al. | |
| 5,846,506 A * | 12/1998 | Esch et al. | 423/338 |
| 5,929,156 A | 7/1999 | Fultz et al. | |
| 6,468,493 B1 | 10/2002 | Chevallier et al. | |
| 7,608,234 B2 | 10/2009 | Stenzel et al. | |
| 2005/0004297 A1 | 1/2005 | Durel et al. | |
| 2006/0093541 A1 * | 5/2006 | Uhrlandt et al. | 423/335 |
| 2007/0100057 A1 * | 5/2007 | Stenzel et al. | 524/492 |
| 2011/0021801 A1 | 1/2011 | Wehmeier et al. | |

FOREIGN PATENT DOCUMENTS

| | | |
|---|---|---|
| DE | 24 47 613 | 4/1976 |
| EP | 0 647 591 | 4/1995 |
| EP | 0 670 813 | 9/1995 |
| EP | 0 937 755 | 8/1999 |

* cited by examiner

Primary Examiner — Hui Chin
(74) Attorney, Agent, or Firm — Walter Ottesen P.A.

(57) ABSTRACT

The invention relates to a rubber mixture, in particular for pneumatic vehicle tires, bands, and belts. The rubber mixture is characterized by the following composition: at least one diene rubber and—at least one precipitated silicic acid having a CTAB surface area greater than or equal to 150 $m^2$/g and a BET surface area greater than or equal to 150 $m^2$/g and a DBP number between 180 and 350 g/100 g and a full width at half maximum, which is standardized to the location of the reflection, of the reflection of less than or equal to 0.95 and a homogeneity ratio d 25% to d 75% of 1.00 to 1.80 and a relative width $Y_{pressed}$ in the compressed state of less than or equal to 2.8 (g nm)/ml and a fineness index $F.V._{pressed}$ in the compressed state between 100 and 140, and further additives.

20 Claims, 1 Drawing Sheet

RUBBER MIXTURE COMPRISING PRECIPITATED SILICIC ACID

CROSS REFERENCE TO RELATED APPLICATIONS

This application is a continuation application of international patent application PCT/EP 2009/051829, filed Feb. 17, 2009, designating the United States and claiming priority from German application 10 2008 017 731.8, filed Apr. 7, 2008, and the entire content of both applications is incorporated herein by reference.

FIELD OF THE INVENTION

The invention relates to a rubber mixture, especially for motor vehicle pneumatic tires, belts and drive belts, with improved abrasion performance.

BACKGROUND OF THE INVENTION

Since the running characteristics of a tire, especially motor vehicle pneumatic tire, depend to a high degree on the rubber composition of the tread, particularly high demands are made on the composition of the tread mixture. Thus, various attempts have been made to vary the tread mixtures with regard to the polymer components thereof and the fillers thereof. It is known, for example, to add carbon black and/or silica to the rubber mixture as fillers.

One of the aims at the forefront of tire development is the reduction of the rolling resistance, which causes a reduced fuel consumption. The use of mixtures comprising silica allows the rolling resistance to be improved over mixtures which comprise only carbon black. At the same time, ideally no deterioration in the other tire properties, such as wet traction and in particular abrasion, should be observed.

Since the distribution of the silica in the rubber mixture and the type of silica have a great influence on the tire properties, various attempts have already been made to synthesize silica with corresponding characteristics, for example with a high specific hydrophilic surface area, or to pretreat or to modify the silica, or to add specific additives to the mixture, in order to bring about an optimal distribution and optimal tire properties, in particular improved abrasion performance.

In the case of use of silicas according, for example, to EP 0520862 B1, EP 0670813 B1, EP 917519 B1, US 2005/0004297 A1, U.S. Pat. Nos. 5,846,311 and 5,929,156, attempts are made to solve the problem of the abrasion behavior by virtue of a particularly good dispersibility of the silicas. However, it has been found that a good dispersibility alone is insufficient to satisfactorily solve the problem.

SUMMARY OF THE INVENTION

It is therefore an object of the invention to provide a rubber mixture which has an optimal distribution of the silica in the rubber mixture and in particular an improved abrasion performance.

This object is achieved by a rubber mixture with the following composition:
- at least one diene rubber and
- at least one precipitated silica with a CTAB surface area greater than or equal to 150 m²/g and a BET surface area greater than or equal to 150 m²/g and a DBP number between 180 and 350 g/100 g and a half-height width of the reflection normalized to the position of the reflection of less than or equal to 0.95 and a homogeneity ratio d 25% to d 75% of 1.00 to 1.80 and a relative width in the pressed state $Y_{pressed}$ of less than or equal to 2.8 (g nm)/ml and a fineness value $F.V._{pressed}$ in the pressed state between 100 and 140 Å and
- further additives.

It has been found that, surprisingly, the inventive rubber mixture, especially the use of at least one precipitated silica described herein, allows the abrasion performance to be improved significantly, while other physical properties, for example rolling resistance and/or wet braking, remain at the same level. This holds true not only for the motor vehicle tire tread, but also for further inner tire components are referred to collectively hereinafter, as typical in tire technology, as body compounds or body mixtures.

Presumably, this effect can be explained by the fact that the precipitated silica used is optimized for homogeneity and at the same time possesses a rough surface, quantifiable via the morphology index IM. Without wishing to be bound to theory, it is believed that the attachment of the precipitated silica surface to the polymer matrix is improved by the rough surface, in particular for the coupling agents. Thus, the inventive rubber mixture leads not only to improved abrasion performance, but also to improved and accelerated attachment of the coupling agent or of the coupling agents.

The precipitated silica used in the rubber mixture has, compared to the prior art precipitated silicas, a particularly homogeneous and narrow particle size distribution, determined by means of a disk centrifuge, in combination with a particular pore size distribution, determined by means of mercury porosimetry. In addition, the inventive silica has good to very good dispersibility. This combination in particular enables homogeneous reinforcement to be ensured over the entire rubber matrix, which results in particular in an improved abrasion performance of the motor vehicle tire.

The inventive rubber mixture further finds use in the development of blends for drive belts and other belts, especially for conveyor belts. In the course of daily use, the running side of conveyor belts in particular is subject to severe mechanical stresses, for example on deflection at drive drums, steering drums and/or guide drums, to withstand the tensile forces which occur. The abrasion performance is therefore of great economic significance here too.

In the present invention, the terms "silicas", "reinforcer silicas" and "precipitated silica" are used interchangeably.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
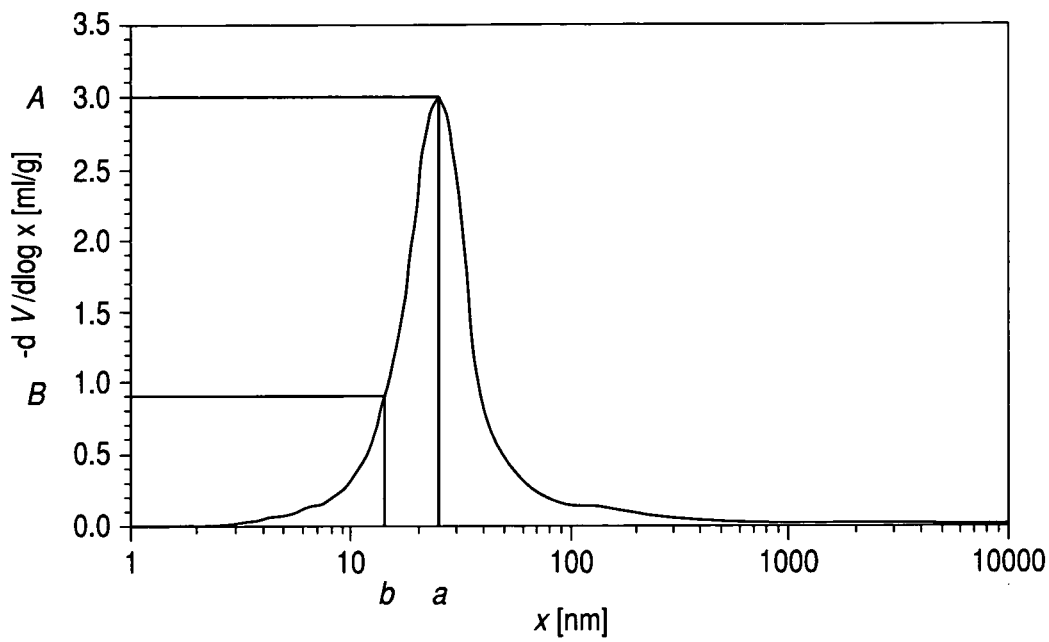
FIG. 1 shows a typical curve profile of the negative logarithmic derivative of the cumulated pore volume V based on the pore diameter x with the features a, b, A and B; and, FIG. 2 is an example of the straight line of the n-alcanes to determine the morphology index.

Before applicant turns to illustrating the inventive rubber mixture in detail, the test methods employed to characterize the precipitated silica should be outlined at this point:

Determination of the Solids Content of Filtercake

This method is used to determine the solids content of filtercake by removing the volatile fractions at 105° C.

To this end, 100.00 g of the filtercake are weighed (starting weight E) into a dry, tared porcelain dish (diameter 20 cm). If appropriate, the filtercake is comminuted with a spatula in order to obtain looser lumps of not more than 1 cm³. The sample is dried to constant weight in a drying cabinet at 105±2° C. Subsequently, the sample is cooled to room temperature in a desiccator cabinet with silica gel as the desiccant. The final weight A is determined gravimetrically.

The solids content (SC) in % is determined by $$SC = A/E * 100\%,$$

where A=final weight in g and E=starting weight in g.

Determination of the Solids Content of Precipitated Suspensions

The solids content of the precipitated suspension is determined gravimetrically after filtration of the sample.

100.0 ml of the homogenized precipitated suspension ($V_{suspension}$) are measured at room temperature with the aid of a graduated cylinder. The sample is filtered off by suction in a porcelain suction filter by means of a round filter (type 572, from Schleicher & Schuell), but not suction-dried in order to prevent crack formation in the filtercake. Subsequently, the filtercake is washed with 100.0 ml of distilled water. The washed filtercake is transferred to a tared porcelain dish and dried to constant weight in a drying cabinet at 105±2° C. After cooling to room temperature, the weight of the dried silica ($m_{sample}$) is determined.

The solids content is determined according to:

solids content in g/l=($m_{sample}$ in g)/($V_{suspension}$ in l).

Determination of the Solids Content of the Silica Feed

The silica feed is dried to constant weight in an IR drier. The drying loss consists predominantly of water moisture.

2.0 g of silica feed are introduced into a tared aluminum dish and the lid of the IR drying unit (from Mettler, LP 16) is closed. After the start button has been pressed, the drying of the suspension at 105° C. commences, and is ended automatically when the decrease in weight per unit time goes below the value of 2 mg/(120 s).

The weight decrease in % is displayed directly by the instrument when the 0-100% mode is selected. The solids content is calculated according to solids content in %=100%−weight decrease in %.

Determination of the Alkali Number

The alkali number (AN) determination is understood to mean the consumption of hydrochloric acid in ml (at sample volume 50 ml, 50 ml of distilled water and using hydrochloric acid of concentration 0.5 mol/l) in a direct potentiometric titration of alkaline solutions, or suspensions up to a pH of 8.30. This detects the free alkali content of the solution or suspension.

The pH instrument (from Knick, Calimatic 766 pH meter with temperature sensor) and the pH electrode (combination electrode from Schott, N7680) are calibrated with the aid of two buffer solutions (pH=7.00 and pH=10.00) at room temperature. The combination electrode is immersed into the test solution or suspension which has been equilibrated to 40° C. and consists of 50.0 ml of precipitated suspension and 50.0 ml of deionized water. Subsequently, hydrochloric acid solution of concentration 0.5 mol/l is added dropwise until a constant pH of 8.30 is established. Owing to the equilibrium between the silica and the free alkali content, which is established only slowly, a wait time of 15 min is needed before the final acid consumption can be read off. For the amounts and concentrations selected, the hydrochloric acid consumption in ml read off corresponds directly to the alkali number, which is reported dimensionlessly.

Determination of the pH

The pH of the silica is determined as a 5% aqueous suspension at room temperature based on DIN EN ISO 787-9. Compared to the requirements of this standard, the starting weights were altered (5.00 g of silica for 100 ml of deionized water).

Determination of the Electrical Conductivity

The determination of the electrical conductivity of silica is carried out as a 4% aqueous suspension at room temperature based on DIN EN ISO 787-14. Compared to the requirements of this standard, the starting weights were altered (4.00 g of silica for 100 ml of deionized water).

Determination of the Moisture Content

The moisture content of silicas is determined according to ISO 787-2 after drying in a forced-air drying cabinet at 105° C. for 2 hours. This drying loss consists predominantly of water moisture.

Determination of the Modified Sears Number, Vol 2 of Silicas

By titrating silica with potassium hydroxide solution in the range from pH 6 to pH 9, it is possible to determine the modified Sears number Vol 2, as a measure of the number of free hydroxyl groups.

The determination method is based on the following chemical reactions, where "Si"-OH is intended to symbolize a silanol group of the silica:

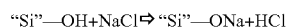

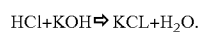

Procedure 10.00 g of a silica in pulverulent form, having approximately spherical particles or silica in granular form with a moisture content 5±1% are comminuted with an IKA universal mill M 20 (550 W; 20 000 rpm) for 60 seconds. In some cases, the moisture content of the starting substance has to be adjusted by drying at 105° C. in a drying cabinet or by homogenous moistening, and the comminution has to be repeated. 2.50 g of the silica thus treated are weighed at room temperature into a 250 ml titration vessel and admixed with 60.0 ml of methanol p.A. After complete wetting of the sample, 40.0 ml of deionized water are added, and dispersion is effected by means of an Ultra Turrax T 25 stirrer (KV-18G stirrer shaft, diameter 18 mm) for 30 seconds at a speed of 18 000 rpm. 100 ml of deionized water are used to rinse the sample particles adhering on the vessel rim and stirrer into the suspension, which is equilibrated to 25° C. in a thermostated waterbath.

The pH meter (from KNICK, Calimatic 766 pH meter with temperature sensor) and the pH electrode (combination electrode from Schott N7680) are calibrated using buffer solutions (pH 7.00 and 9.00) at room temperature. The pH meter is first used to measure the starting pH of the suspension at 25° C., then, according to the result, the pH is adjusted to 6.00 with potassium hydroxide solution (0.1 mol/l) or hydrochloric acid solution (0.1 mol/l). The consumption of KOH or HCl solution in ml to pH 6.00 corresponds to $V_1'$.

Thereafter, 20.0 ml of sodium chloride solution (250.00 g of NaCl p.A filled to 1 l with deionized water) are metered in. 0.1 mol/l KOH is then used to continue the titration up to pH 9.00. The consumption of KOH solution in ml up to pH 9.00 corresponds to $V_2'$.

Subsequently, the volumes $V_1^1$ and $V_2'$ are first normalized to the theoretical starting weight of 1 g and multiplied by 5, which gives Vol 1 and the modified Sears number Vol 2 in the units of ml/(5 g).

Determination of the DBP Absorption

The DBP absorption (DBP number), which is a measure of the adsorption capacity of the precipitated silica, is determined based on the standard DIN 53601 as follows:

12.50 g of silica in pulverulent form or having approximately, spherical particles and with moisture content 0-10% (if appropriate, the moisture content is adjusted by drying at 105° C. in a drying cabinet) are introduced into the kneader chamber (article number 279061) of the Brabender absorptometer "E" (without damping of the outlet filter of the torque transducer). In the case of granules, the screening fraction from 1 to 3.15 mm (stainless steel screens from Retsch) is used (by gently pressing the granules with a plastic spatula through the screen of pore size 3.15 mm). Under constant agitation (peripheral speed of the kneader paddles 125 rpm), dibutylphthalate is mixed-in dropwise at room temperature to the mixture at a rate of 4 ml/min by means of the Brabender T 90/50 Dosimat. Mixing-in occurs with only a small amount of force and is monitored using the digital display. Towards the end of the determination, the mixture becomes pasty, which is indicated by means of a rapid rise in the force required. When the display shows 600 digits (torque of 0.6 Nm), an electrical contact shuts off both the kneader and the DBP metering. The synchronous motor for the DBP feed is coupled to a digital counter, and so the consumption of DBP in ml can be read off.

The DBP absorption is reported in g/(100 g) and is calculated by the following formula:

$$DBP = \frac{V*D*100}{E} * \frac{g}{100\ g} + K$$

where
DBP=DBP absorption in g/(100 g)
V=consumption of DBP in ml
D=density of DBP in g/ml (1.047 g/ml at 20° C.)
E=starting weight of silica in g
K=correction value according to moisture content correction table in g/(100 g)

The DBP absorption is defined for the anhydrous, dried silica. In the case of moist precipitated silicas, the correction value K has to be taken into account for the calculation of the DBP absorption. This value can be determined with reference to the following correction table; for example, a water content of the silica of 5.8% would mean addition of 33 g/(100 g) for the DBP absorption. The moisture content of the silica is determined by means of the method "determining the moisture content or the drying loss".

TABLE 1

Moisture content correction table for dibutylphthalate absorption (anhydrous)

| % moisture content | % moisture content | | | | |
|---|---|---|---|---|---|
| | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Bet Surface Area

The specific nitrogen surface area (referred to hereinafter as BET surface area) of the silica in pulverulent form, having approximately spherical particles, or silica in granular form is determined based on ISO 5794-1/Annex D with the TRISTAR 3000 instrument (from Micromeritics) by the multipoint determination to DIN-ISO 9277.

Determination of the CTAB Surface Area

The method is based on adsorption of CTAB (N-hexadecyl-N,N,N-trimethylammonium bromide) on the "outer" surface of the silica based on ASTM 3765, or NFT 45-007 (Chapter 5.12.1.3).

CTAB is adsorbed in aqueous solution with stirring and ultrasound treatment. Excess, unadsorbed CTAB is determined by back-titration with NDSS (dioctylsodium sulfosuccinate solution, "Aerosol OT" solution) with a titroprocessor, the end point being given by the maximum of turbidity of the solution and being determined with a phototrode. The temperature during performance of all operations is 23-25° C., in order to prevent the crystallization of CTAB. The back-titration is based on the following reaction equation:

$$\underset{NDSS}{(C_{20}H_{37}O_4)SO_3Na} + \underset{CTAB}{BrN(CH_3)_3(C_{16}H_{33})} \Rightarrow$$

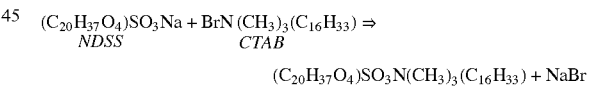

$$(C_{20}H_{37}O_4)SO_3N(CH_3)_3(C_{16}H_{33}) + NaBr$$

Instruments
METTLER Toledo DL 55 titroprocessor and METTLER Toledo DL 70 titroprocessor, each equipped with: pH electrode, manufacturer:
Mettler, DG 111 and phototrode, manufacturer: Mettler, DP 550 100 ml polypropylene titration cup
Titration glass vessel, 150 ml with lid
Pressure filtration unit, capacity 100 ml
Membrane filter made of cellulose nitrate, pore size 0.1 μm, Ø47 mm, for example Whatman (cat. No. 7181-004)
Reagents
The solutions of CTAB ($C_{CTAB}$=0.015 mol/l in deionized water) and NDSS (concentration=0.00423 mol/l in deionized water) are purchased ready for use (from Bernd Kraft GmbH, 47167 Duisburg: catalog No. 6056.4700 CTAB solution of concentration 0.015 mol/l; catalog No. 6057.4700 NDSS solution 0.00423 mol/l), stored at 25° C. and used within one month.

Procedure

1. Blank Titration

The consumption of NDSS solution for titration of 5 ml of CTAB solution should be checked 1× daily before each test series. To this end, the phototrode, before the start of the titration, is adjusted to 1000±20 mV (corresponding to a transparency of 100%).

Exactly 5.00 ml of CTAB solution are pipetted into a titration cup and 50.0 ml of deionized water are added. With stirring, the titration with NDSS solution is effected by the test method familiar to those skilled in the art with the DL 55 titroprocessor up to max. turbidity of the solution. The consumption $V_A$ of NDSS solution is determined in ml. Each titration should be conducted as a triple determination.

2. Adsorption 10.0 g of the silica in pulverulent form, having approximately spherical particles, or silica in granulated form, with a moisture content of 5±2% (if appropriate, the moisture content is adjusted by drying at 105° C. in a drying cabinet or homogeneous moistening), are comminuted with a mill (IKA M 20 mill with M 21 stainless steel beaters) for 60 seconds. Exactly 500.0 mg of the comminuted sample (starting weight E) are transferred to a 150 ml titration vessel with a magnetic stirrer bar and exactly 100.0 ml of CTAB solution ($T_1$) are metered in. The titration vessel is closed with a lid and stirred until wetting is complete with an Ultra Turrax T 25 stirrer (KV-18G stirrer shaft, diameter 18 mm) at 18 000 rpm for not more than 1 min. The titration vessel is screwed onto the DL 70 titroprocessor and the pH of the suspension is adjusted with KOH (0.1 mol/l) to a value of 9±0.05.

There follows a 4-minute ultrasound treatment of the suspension in the titration vessel in an ultrasound bath (from Bandelin, Sonorex RK 106 S, 35 kHz, 100 W effective or 200 W peak power) at 25° C. This is followed by an immediate pressure filtration through a membrane filter at a nitrogen pressure of 1.2 bar. The first runnings of 5 ml are discarded.

3. Titration 5.00 ml of the remaining filtrate are pipetted into a 100 ml titration cup and filled up to 50.00 ml with deionized water. The titration cup is screwed onto the DL 55 titroprocessor and titration with NDSS solution is effected with stirring up to the maximum turbidity. The consumption $V_B$ of NDSS solution is determined in ml. Each titration is conducted as a triple determination.

Calculation $$CTAB(\text{not moisture-corrected}) = \frac{V_A - V_B}{V_A} * \frac{C_{CTAB} * M_{CTAB} * T_1 * P}{E}$$

$V_A$=consumption of NDSS solution in ml in the titration of the blank sample
$V_B$=consumption of NDSS solution in ml using the filtrate
$C_{CTAB}$=concentration of the CTAB solution in mol/l
$M_{CTAB}$=molar mass of CTAB=364.46 g/mol
$T_1$=amount of CTAB solution added in l
P=space requirement of CTAB=578.435 m²/g
E=starting weight of silica The CTAB surface area is based on the anhydrous silica, and the following correction is therefore carried out.

$$CTAB = \frac{CTAB(\text{not moisture-corrected}) \text{ in } m^2/g * 100\%}{100\% - \text{moisture content in } \%}$$

The moisture content of the silica is determined by the "determination of the moisture content" method described.

Determination of the Particle Size Distribution

The particle size distribution of silica is determined. The sample to be studied is ground, then dispersed in an aqueous solution and separated according to its particle size in a disk centrifuge: the larger—and hence heavier—the particles are, the more rapidly they move in the gravitational field of the centrifuge. There, they pass through a light barrier; the absorption is measured as a function of time. These data are used to calculate the particle size distribution, i.e. the frequency as a function of the particle diameter.

Instruments Used:
Disk centrifuge CPS Instruments Inc., DC24000
Utrasound finger Hielscher UP200S with S14 Sonotrode
Universal mill IKA M20 with M21 stainless steel beaters
Lauda cooling bath RM6 with RMS cold thermostat
Analytical balance
Syringes: 1.0 ml and 2.0 ml
Beaded-edge snap-lid glass bottles; 30 ml.
Chemicals:
Ethanol p.A., from Merck
Water, deionized
Sucrose, from Acros
Dodecane, from Merck
PVC reference standard; the peak maximum of the reference standard used should be between 500 and 600 nm.

Preparation of the Disk Centrifuge

The running disk centrifuge is filled with a density gradient of sucrose solutions and provided with a dodecane cover layer.

Procedure:

Sugar solutions of different concentration are prepared. The proportions by mass of the sugar solutions are between w=8.0% and w=24.0%. The density gradient is built up in nine stages: 24.0%/22.0%/20.0%/18.0%/16.0%/14.0%/12.0%/10.0%/8.0%

In each case, 1.6 ml of the various sugar solutions per density stage are injected into the disk centrifuge, beginning with the highest concentration. Finally, 0.5 ml of dodecane is injected.

Sample Preparation

Before the dispersion, the silica sample is ground. To this end, 15 g (±0.5 g) of sample material is ground in the IKA universal mill for 60 seconds. 0.75 g (±0.05 g) of this ground material is weighed into a 30 ml beaded-edge snap-lid glass bottle and admixed with 15 ml of deionized water. The filled beaded-edge snap-lid glass bottle (from LABC, 5 ml ND20 beaded-edge bottle, 38×20 mm, clear glass) is fixed with the aid of a clamp in a cooling bath at a controlled temperature of approx. 5° C. The ultrasound finger is positioned such that the sonotrode is immersed 5.5 cm deep (but at least 5 cm) into the bottle—measured from the upper edge of the beaded-edge bottle. The sample is treated with ultrasound at 100% amplitude and 100% pulse (cycle=1) for 15 minutes.

Procedure

Before the start of the measurements, the centrifuge is allowed to warm up at the preset speed (20 000 rpm) for at least 30 min. All measurements likewise run at a rotational speed of 20 000 rpm. The measurement procedure is accessed via the instrument software. For the measurements, the following parameters have to be established:

Sample Parameters:
    Maximum Diameter: 5.10 microns
    Minimum Diameter: 0.01 microns Particle Density: 2.0 g/ml
Particle Refractive Index: 1.44
Particle Absorption: 0.001 K
Non-Sphericity Factor: 1.1
Calibration Standard Parameters (depending on the calibration standard used):

EXAMPLE

Peak Diameter: 0.585 micron
Half Height Peak Width: 0.2 micron
Particle Density: 1.385 g/ml
Fluid Parameters:
　　Fluid Density: 1.045 g/ml
　　Fluid Refractive Index: 1.344
　　Fluid Viscosity: 1.2 cps
In the "system configuration" submenu, the measurement wavelength is set to 470 nm.
In the "runtime options" submenu, the following parameters are selected:
Force Baseline Yes
Correct for Non-Stokes: No
Extra Software Noise Filtration: No Extra Filter
Baseline Drift Display: Do Not Show
Calibration method: External
Samples per calibration: 1

To analyze the sample dispersion, the "operate analyser" submenu is selected. The steps required for the analysis are prompted successively in the "instructions" line. Before each analysis, a calibration standard should be recorded. In each case 0.1 ml of the standard or of the sample dispersion is injected. A double determination of each sample to be analyzed (including dispersion by means of ultrasound) is carried out.

The analyses on the silica dispersions to be analyzed are terminated manually at the point at which the absorption, after the recording of the peak to be analyzed, which should generally be between 30 nm and 250 nm, reaches the starting value again, generally 0.

Result

The weight distribution is determined from the raw data curve (corrected by the light scatter) by the instrument software (CPS Disc Centrifuge Operating Software; Version 9.5b; Released February 2006). The results are determined in each case from the averaged values from the double determination.

The following are reported:

Peak (Mode), unit μm, most common particle size, corresponds to the abscissa value of the maximum of the distribution function. This value is calculated by the instrument software.

Half Width, unit μm, corresponds to the width of the distribution function at 50% of its maximum value. This value is calculated by the instrument software.

Oversize Percentiles, unit μm, corresponds to the proportion specified (1%, 5%, 10%, 25%, 50%, 75%, 90%, 95%, 99%) of the particles which are larger than the reported particle diameter of the weight distribution. These values are calculated by the instrument software.

d 25%/d 75% quartile ratio, no unit, a further measure of the width of the distribution, formed from the ratio of the particle sizes at 25% and 75%, can be read off from the oversize percentiles parameters. This value must be calculated manually. It is also referred to as the homogeneity ratio.

Half Width/Peak, no unit, the quotient of the half-height width data and of the peak must be calculated manually.

Determination of the Particle Size by Means of Laser Diffraction

The use of laser diffraction to determine particle sizes of powders is based on the phenomenon that particles scatter monochromatic light in all directions with a different intensity pattern. This scatter depends on the particle size. The smaller the particle, the greater the angles of scatter are.

The sample preparation and analysis (flushing of the module, etc.) are effected, in the case of hydrophilic precipitated silica, with demineralized water, and in the case of insufficiently water-wettable precipitated silica with pure ethanol.

Before the start of the analysis, the LS 230 laser diffraction instrument (from Coulter) and liquid module (Small Volume Module Plus, 120 ml, from Coulter) is allowed to warm up for 2 h, the module is flushed three times with demineralized water and calibrated and, in the case of hydrophobic precipitated silicas, flushed three times with ethanol.

In the control bar of the instrument software, the "analysis" menu item is used to select the file window "calculate Opt. Model", and the refractive indices are recorded in an .rfd file: liquid refractive index R. I. Real=1.332 (1.359 for ethanol); material refractive index Real=1.46; Imaginary=0.1; form factor 1. In addition, in this file window, the following points are selected: offset analysis, adjustment, background measurement, adjust analysis concentration, input sample info, input analysis info, analysis time 60 s, number of measurements 1, no PIDS data, size distribution. The pump speed is set to 30% on the instrument.

The homogeneous suspension of 1 g of silica in 40 ml of demineralized water is added with a 2 ml disposable pipette to the liquid module of the instrument in such a way that a constant concentration with a light absorption of 8 to 12% is achieved and the instrument shows "OK". The analysis is carried out at room temperature. The raw data curve is used by the software to calculate, on the basis of the volume distribution, taking into account Mie theory and the optical model parameters (.rfd file), the particle size distribution and the $d_{50}$ value (median).

Determination of the Screen Residue (Alpine)

Screen residue determination is performed by an air jet screening based on DIN ISO 8130-1 by means of an Alpine S 200 air-jet screening system. To determine the $d_{50}$ values of microgranules and granules, screens with a mesh size of >300 μm are also used for this purpose. In order to determine the $d_{50}$, the screens must be selected such that they afford a particle size distribution from which the $d_{50}$ value can be determined according to FIG. 2. The graphic representation and evaluation are analogous to ISO 2591-1, Chapter 8.2.

The $d_{50}$ value is understood to mean the particle diameter in the cumulative particle size distribution at which 50% of the particles have a smaller or equal particle diameter than/to the particles with the particle diameter of the $d_{50}$ value.

Determination of the Screen Residue (Ro-Tap)

This method is used to determine the proportion of relatively coarse particles (>300 μm) and the proportion of relatively fine particles (<75 μm) of granules by means of screening.

A screening pan, an analysis screen with metal wire gauze (DIN ISO 565 T.2, nominal mesh size 75 μm), an analysis screen with metal wire gauze (DIN ISO 565 T.2, nominal mesh size 150 µm), and an analysis screen with metal wire gauze (DIN ISO 565 T.2, nominal mesh size 300 µm) with screen diameter in each case 200 mm, are used. The screening tower is introduced in the sequence specified in to a Ro-Tap B 8260 analytical screening machine with time switch from Tyler, and a homogeneous amount of sample of 100.00 g of the silica granules is transferred to the uppermost screen. The screen lid and the tapper are attached and the screening is effected with a circular and tapping motion for 5 min.

The screen residues (Ro-Tap) are determined according to screen fraction (Ro-Tap, <75 µm) in %=$(A_S/E)*100\%$, and screen residue (Ro-Tap, >300 µm) in %=$(A_{300}/E)*100\%$, where $A_S$=final weight of the residue in the screening pan in g, $A_{300}$=final weight of the residue on the screen of nominal mesh size 300 µm in g and E=starting weight in g.

Determination of the Aluminum Oxide Content

The aluminum oxide content is determined on the basis of DIN EN ISO 3262-18 by means of flame atomic adsorption spectroscopy at a wavelength of 309.3 nm.

Approx. 20 g of a silica are weighed accurately to 0.01 g into a platinum crucible and moistened with distilled water. 1 ml of conc. hydrofluoric acid (40%, p.a.) is added and the mixture is heated in a sandbath until it fumes. Nitric acid is gradually added dropwise until the silica has dissolved completely. After concentrating to dryness, the residue is dissolved in 3 ml of conc. hydrochloric acid. The cooled solution is transferred quantitatively into a 100 ml standard flask and filled up to 100 ml therein with distilled water.

The solution thus prepared is analyzed according to the operating instructions in a flame atomic adsorption spectrometer (wavelength: 309.3 nm, Slit S: 0.7 nm, gas stream: acetylene/$N_2O$).

The aluminum oxide content is determined on the original sample, but the content is based on the sample calcined at 1000° C. for 2 h.

$$\% \ Al_2O_{3(based\ on\ calcined\ substance)} = \frac{\%\ Al_2O_{3(based\ on\ original\ substance)} \times 100}{100\% - \text{ignition loss in }\%}$$

Determination of the Pore Size Distribution
Pretreatment of the Silicas Before Mercury Porosimetry Before the analysis, the silica is subjected to a pressure treatment. For this purpose, a manual hydraulic press is used (catalog No. 15011 from Specac Ltd., River House, 97 Cray Avenue, Orpington, Kent BR5 4HE, U.K.). 250 mg of silica are weighed into a pellet die of internal diameter 13 mm from Specac Ltd. and, according to the display, loaded with 1 t. This load is maintained for 5 s and, if appropriate, readjusted. Subsequently, the sample is decompressed and dried in a forced-air drying cabinet at 105±2° C. for 4 h.

Procedure of the Mercury Porosimetry Analysis

The method is based on Hg intrusion to DIN 66133, using an Autopore IV 9500 instrument from Micromeritics. The silica is weighed accurately to 0.001 g into the type 10 penetrometer. Subsequently, the penetrometer is evacuated slowly to 50 µm Hg and left at this pressure for 5 min. The Autopore instrument is operated according to the operating instructions with Software Version IV 1.05. Each measurement is corrected by a blank measurement of the penetrometer. The measurement range is 0.0025-420 MPa, using at least 136 equilibrium measurement points (instrument-specific criterion of 10 s) (in the 0.0025-0.25 MPa range: 30 points, in the 0.25-15 MPa range: 53 points, 15-150 MPa: 40 points, in the 150-420 MPa range: 13 points). If appropriate, the software inserts further measurement points when the incremental intrusion volume is >0.04 ml/g. The intrusion curve is smoothed by means of the "smooth differentials" function of the instrument software.

Determination of the Fineness Value F.V. (with Pressure Pretreatment), Unit Å

The fineness value F.V. represents the mean radius of the intraaggregate pores, i.e. the radius of the pores to which the pore surface area $S_0/2$, measured by mercury porosimetry, corresponds ($S_0$ is the surface area which is contributed by all pores whose diameter is greater than or equal to 100 Å). For the calculation, a contact angle of 140° and a surface tension of 484 mN/m are assumed.

Determination of the Pore Volume Ratio V2/V1
(with Pressure Pretreatment)

Pore volume ratio V2/V1, no unit Since silicas may be present in various presentation forms—for example in the form of powders, for instance spherical particles or granules—there has to be a preceding mechanical pressure treatment of the silica here too, in order to obtain a measured value substantially independent of the presentation form.

For the calculation, a contact angle of 130° and a surface tension of 484 mN/m are assumed. The pore volume V1 is determined from the cumulated pore volume in the pore diameter range of 5.5-40 nm. The pore volume V2 is determined from the cumulated pore volume in the pore diameter range of 17.5-27.5 nm. The proportion of the pores in the V2 range is determined from the quotient V2/V1.

Determination of The Relative Width of The Pore Size Distribution (with Pressure Pretreatment)

Relative width Y, unit (g·nm)/ml

Since silicas may be present in various presentation forms—for example in the form of powders, for instance spherical particles or granules—there has to be a preceding mechanical pressure treatment of the silica here too, in order to obtain a measured value substantially independent of the presentation form.

For the calculation, a contact angle of 140° and a surface tension of 480 mN/m are assumed. In order to determine the relative width Y of the pore size distribution, the following algorithm is applied to the data of the negative logarithmic derivative of the intrusion curve in the pore diameter range of 3.5 nm to 5 µm: the algorithm uses a moveable window which originates from large pore diameters and is composed of three successive measurement points of the negative logarithmic derivative of the intrusion curve, and places a parabola through the points. The maximum of the parabola is defined as the sought-after maximum A at a pore diameter a. It is checked if the point a is within the sought-after pore diameter range and is the global maximum of the negative logarithmic derivative of the intrusion curve. If this is not the case, the window is shifted by one point, another parabola is placed, and the operation is repeated until both criteria are met. Then, B is defined as 0.300 A. Let b be the pore diameter of the curve which is smaller than a at which the value B is attained for the first time. Finally, the relative width Y of the pore size distribution is defined as Y=(a−b)/(A−B)=(a−b)/(0.7 A), where a and b are in nanometers and Y has the unit (gnm)/ml. A typical curve profile of the negative logarithmic derivative of the cumulated pore volume V according to equation 1 with regard to the pore diameter x with i measurement points and the features a, b, A and B is shown in FIG. 1. Equation 1:

$$\frac{dV}{d\log x} = \frac{dV}{\frac{1}{x}dx} = x\frac{dV}{dx}$$

$$x\frac{dV}{dx} \approx x\frac{\Delta V}{\Delta x}\Big|_{\Delta x = x_i - x_{i-1}} = x_i \frac{V_i - V_{i-1}}{x_i - x_{i-1}} \approx x_i \frac{V_{i+1} - V_{i-1}}{x_{i+1} - x_{i-1}}$$

Determination of the Morphology Index

The analyses were carried out using a FISONS HRGC Mega 2 instrument equipped with a flame ionization detector (FID).

The silica was pressed with an ICL (International Crystal Laboratories) hydraulic laboratory press at a load of 2 tonnes for 2 minutes, in order to obtain a single round pellet of diameter 13 mm and height 5 mm.

This pellet is then crushed manually with a pestle in an Achat mortar for 30 seconds (capacity 30 ml, internal diameter 65 mm). The crushed material is then screened manually through two stainless steel screens with a diameter of 100 mm and a height of 45 mm from Bioblok Scientific. The meshes of the screens are 0.425 mm (Mesh 40) and 0.106 mm (Mesh 140). The screens are arranged in the sequence of decreasing mesh size. Below the last screen there is a collecting dish.

This procedure is repeated with several pellets until sufficient material is available to fill the column. The material which remains on the screen of mesh size 0.106 mm (screen fraction of 0.425 to 0.106 mm) is used to fill the column.

The chromatographic column is prepared as follows: a stainless steel tube of diameter ⅛" is cut to the required length. The length of the column depends on the specific surface area of the solid to be analyzed. The rule here is that the amount of solid in the column must have a surface area of 20 to 40 m². The manufacturer of this tube is Interchrom.

The powder prepared (see the above description) is introduced homogeneously into the chromatographic column through a conical funnel. It must be ensured that no cavities form in the bed. The flame ionization detector is operated at 150° C., the injector heated to 120° C. Before the analysis, the column is baked out by baking it out at 160° C. at a helium flow of 15 l/min for 15 hours. The determination of the straight lines of the n-alkanes and of the surface nanoroughness is carried out at 110° C. under a helium flow rate of 20 l/min. For the flame ionization detector, the most sensitive setting of the detector is selected.

Figure 2:
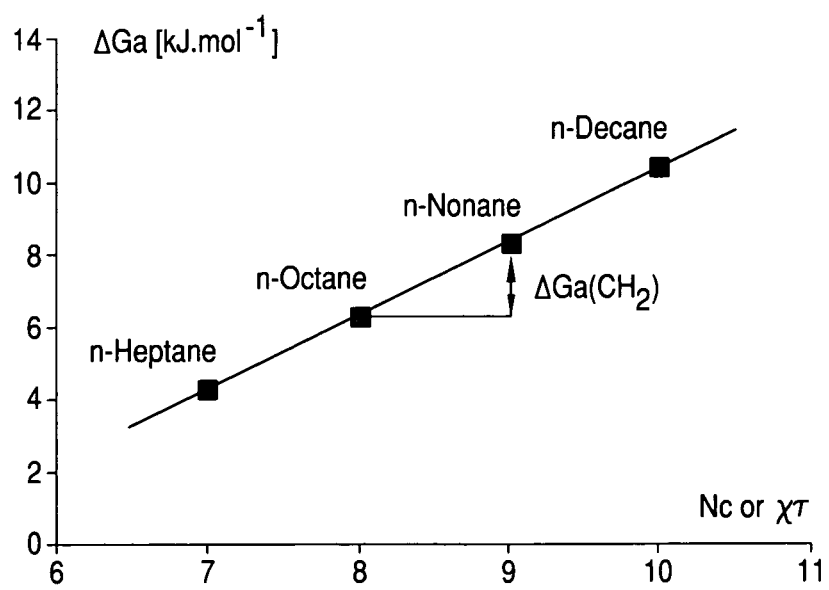

The linear alkanes which were used for the determination of the straight lines are n-heptane, n-octane, n-nonane and n-decane. At least 3 injections are undertaken for each solution, the net retention times are determined and the values are averaged. An example of the straight line of the n-alcanes to determine the morphology index is shown in FIG. 2.

The net retention time of each solution is calculated from the difference of gross retention time and dead time. The dead time is based on the gross retention time of methane. The gross retention times correspond to the retention time of the center of the chromatographic peak (not of the peak apex).

It is important here that the net retention times are independent of the amount injected (this is the proof that analysis is effected under the conditions of infinite dilution).

The branched and cyclic alkane samples for the determination of nanoroughness are 2,2,4-trimethylpentane, 2,2-dimethylhexane and cyclooctane. The morphology index (IM) is calculated from the ratio of the retention volume of the particular branched or cyclic alkane $V_G(M)$ and of the retention volume of an n-alkane $V_G(C)$, which has the same accessibility to the silica surface:

$$IM = V_G(M)/V_G(C)$$

In this way, one IM each is determined for 2,2,4-trimethylpentane, 2,2-dimethylhexane and cyclooctane. The IM specified in the description corresponds to the mean of the three morphology indices determined beforehand for 2,2,4-trimethylpentane, 2,2-dimethylhexane and cyclooctane.

All solutions injected are of chromatographic quality. The following products were used:
n-heptane, for HPLC, ≧99.5% (GC), FLUKA
n-octane, puriss. p.a., Standard for GC, ≧99.8% (GC), FLUKA
n-nonane, puriss. p.a., Standard for GC, ≧99.8% (GC), FLUKA
n-decane, puriss. purum, ≧98.0% (GC), FLUKA
cyclooctane, purum, ≧99.0% (GC), FLUKA
2,2,4-trimethylpentane, for HPLC, ≧99.5% (GC), FLUKA
2,2-dimethylhexane, purum, ~98.0% (GC), FLUKA The silica present in the inventive rubber mixture can be prepared by a process comprising the following steps:

a) initially charging an aqueous solution of an alkali metal or alkaline earth metal silicate and/or an organic and/or inorganic base b) simultaneously metering at least one alkali metal and/or alkaline earth metal silicate and at least one acidifier into this initial charge with stirring at 75 to 88° C. for 60 to 120, preferably 70 to 90, minutes c) optionally, continuing the addition of the acidifier used in step b) and/or of another acidifier, with the same or a different metering rate from that in step b), until a pH of the precipitate suspension of 7 to 10 has been attained and continuing to stir the resulting suspension at this pH for 40 to 80 minutes, at high temperatures of 80 to 98° C.

d) reacidifying with at least one acidifier to a pH of about 5 to about 8 e) reacidifying with at least one acidifier to a pH of 4 to 5, the metering rate of the acidifier being less than in step d).

f) filtering the precipitate suspension g) washing the filtercake h) optionally liquefying the filtercake i) drying j) optionally grinding and/or granulating.

The initial charge in step a) of the process may be approx. 20, 30, 40, 50, 60, 70, 80 or 90% of the final volume of the precipitate. The basic compounds added to the initial charge are especially selected from the group of the alkali metal hydroxides, alkaline earth metal hydroxides, alkali metal carbonates, alkali metal hydrogencarbonates and alkali metal silicates. Preference is given to using waterglass and/or sodium hydroxide solution. The pH of the initial charge is between 7 and 14, preferably between 10 and 11.

The addition of at least one alkali metal silicate and/or alkaline earth metal silicate and at least one acidifier during step b) is preferably effected in such a way that the precipitation proceeds at a constant alkali number of 15 to 40, more preferably 15 to 25.

During the simultaneous addition of the alkali metal silicate and/or alkaline earth metal silicate in step b), the reaction mixture is stirred intimately. In a particularly preferred embodiment of the process, the reaction solution in step b) and/or c) is not just stirred, but shear energy is additionally introduced by means of a shearing unit, in order to further improve the dispersibility of the particles obtained.

After step b), in the process, the alkali metal silicate and/or alkaline earth metal silicate addition is stopped.

During one or more of steps a) to j), an additional addition of organic or inorganic salts can optionally be effected. This can be carried out in solution or as a solid, in each case continuously over the addition time of the waterglass and of the acidifier, or as a batch addition. It is also possible to dissolve the salts in one or both components and then to add them simultaneously therewith.

The inorganic salts used are preferably alkali metal or alkaline earth metal salts. In particular, it is possible to use all combinations of the following ions:
$Li^+$, $Na^+$, $K^+$, $Rb^+$, $Be^{2+}$, $Mg^{2+}$, $Ca^{2+}$, $Sr^{2+}$, $Ba^{2+}$, $H^+$, $F^-$, $Cl^-$, $Br^-$, $I^-$, $SO_3^{2-}$, $SO_4^{2-}$, $HSO_4^-$, $PO_3^{3-}$, $PO_4^{3-}$, $NO_3^-$, $NO_2^-$, $CO_3^{2-}$, $HCO_3^-$, $OH^-$, $TiO_3^{2-}$, $ZrO_3^{2-}$, $ZrO_4^{4-}$, $AlO_2^-$, $Al_2O_4^{2-}$, $BO_4^{3-}$.

Suitable organic salts are the salts of formic acid, acetic acid and propionic acid. Cations include the alkali metal or alkaline earth metal ions mentioned. The concentration of these salts in the solution added may be 0.01 to 5 mol/l. The inorganic salt used is preferably $Na_2SO_4$.

It is possible to supply the acidifiers in steps b) to d) in the same way or in different ways, i.e. with the same or different concentration and/or feed rate.

Analogously, it is also possible to supply the alkali metal silicate and/or alkaline earth metal silicate to the reaction in the same way or in different ways in steps a) and b).

The alkali metal silicate and/or alkaline earth metal silicate used may, as well as waterglass (sodium silicate solution), also be other silicates, such as potassium silicate or calcium silicate. The acidifiers used may, as well as sulfuric acid, also be other acidifiers such as HCl, $HNO_3$, $H_3PO_4$ or $CO_2$.

Filtration, liquefaction (for example according to DE 2447613) and long- or short-term drying of the silicas used in steps f) to i) are familiar to those skilled in the art and can be looked up, for example, in the documents cited in this description. The filtration and the washing of the silica are preferably effected in such a manner that the conductivity of the end product is <2000 μS/cm and particularly <1300 μS/cm (4% by weight suspension in water).

Preferably, the washed filtercake, after step g), is liquefied in step h) by adding water and/or at least one acidifier and then dried. In the course of this liquefaction, in a specific embodiment, aluminum, preferably in the form of an aluminate, more preferably in the form of sodium aluminate, can be added during the liquefaction. This allows an increased aluminum content in the resulting precipitated silica to be achieved.

Preferably, the silica used is dried in a stream drier, spray drier, staged drier, belt drier, rotary tube drier, flash drier, spin-flash drier or spray tower. These drying variants include operation with an atomizer, a one- or two-fluid nozzle, or an integrated fluidized bed. Spray drying can be carried out, for example, according to U.S. Pat. No. 4,094,771. Spray tower drying can be carried out, for example, as described in EP 0937755.

The drying may optionally be followed by grinding and/or granulation with a roll compactor. After the drying step or the grinding, the precipitated silica present in the inventive rubber mixture is preferably in the form of a powder with a particle size $d_{50}$ determined by means of laser diffraction of 1 to 80 μm. The pulverulent particles may have an irregular or else a regular outer form, i.e. they may, for example, also be approximately spherical particles. More preferably, the precipitated silica, after spray tower drying, is in the form of approximately spherical particles (microgranule) with a particle size $d_{50}$, determined by means of screen residue determination (Alpine), of 80 μm to 1000 μm. In the latter case, the silica is preferably prepared by means of nozzle tower drying, as described in EP 0937755, and exhibit an outer form characteristic of this drying method (see figures in EP 0937755). Most preferably, the precipitated silica is in the form of granules ($d_{50}$>1000 μm (Alpine screen residue)) and has, after granulation, such a particle size distribution that, by means of screen residue determination (Ro-Tap), at least 80% by weight of the particles are larger than 300 μm and at most 10% by weight are smaller than 75.

It has been found that spin-flash drying with subsequent roller granulation is very particularly suitable for preparing the silica with a rough surface. The granulation can be carried out, for example, with a WP 50N/75 roller press from Alexanderwerk AG, Remscheid. Preferably, the pulverulent product, without any further addition of binders or liquids, via a horizontal introduction system with a single screw, is vented by means of a vacuum system and introduced homogeneously between the vertically arranged rollers mounted on both sides. This presses the powder to a slug which is converted to the desired maximum granule size by means of a crusher.

The inventive rubber mixture comprises at least one diene rubber selected from the group consisting of natural polyisoprene and/or synthetic polyisoprene and/or polyethylene and/or polybutadiene and/or styrene-butadiene copolymer and/or solution-polymerized styrene-butadiene copolymer and/or emulsion-polymerized styrene-butadiene copolymer and/or styrene-isoprene-butadiene terpolymer and/or butyl rubber and/or halobutyl rubber and/or ethylene-propylene-diene rubber and/or chloroprene rubber.

The abovementioned diene rubber(s) used may be modified here with hydroxyl groups and/or with epoxy groups and/or with siloxane groups and/or with primary or secondary amino groups and/or alkoxysilyl groups and/or carboxyl groups and/or mercapto groups and/or aminosiloxane groups and/or further groups known to those skilled in the art.

The diene rubber may also be nonfunctionalized, such that all rubbers, some of the rubbers or no rubber is/are functionalized in the rubber mixture.

A high specific CTAB surface area of the precipitated silica is a prerequisite for a sufficiently good reinforcement potential. The precipitated silica used therefore has a CTAB surface area of =150 $m^2/g$, preferably of 160 to 220 $m^2/g$, more preferably of 160 to 190 $m^2/g$ and most preferably of 165 to 185 $m^2/g$.

The specific BET surface area (cf. S. Brunauer, P. H. Emmett, E. Teller, "Adsorption of Gases in Multimolecular Layers", J. Am. Chem. Soc. 60, 309 (1938)) describes the influence of the precipitated silica on the incorporation behaviour into the rubber mixture, the crude mixture properties and the vulcanization kinetics. In a further specific embodiment, the precipitated silica used has a BET surface area of =150 $m^2/g$, preferably of 150 to 220 $m^2/g$, more preferably of 160 to 210 $m^2/g$ and most preferably of 165 to 195 $m^2/g$.

The sufficiently high DBP number of the precipitated silica used ensures sufficiently good dispersibility in the rubber mixture. The precipitated silica therefore has a DBP number of 180 to 350 g/(100 g), preferably of 180 to 300 g/(100 g) and of 190 to 290 g/(100 g), more preferably of 200 to 280 g/(100 g) and most preferably of 210 to 270 g/(100 g). In a preferred embodiment, the DBP number is 200 to 350 g/(100 g), more preferably 210 to 350 g/(100 g), even more preferably 220 to 350 g/(100 g), especially preferably 230 to 320 g/(100 g) and very especially preferably 240 to 290 g/(100 g) for powder and approximately spherical particles (microgranule). In another preferred embodiment, the DBP number is 180 to 300 g/(100 g), more preferably 190 to 280 g/(100 g), even more preferably 200 to 260 g/(100 g), especially preferably 210 to 250 g/(100 g) and very especially preferably 210 to 240 g/(100 g) for granules.

It has been found to be a further important prerequisite for improved abrasion performance of the rubber mixture that the precipitated silica used must have a narrow and homogeneous particle size distribution. The width of the particle size distribution, determined by means of a disk centrifuge, is characterized by the half-height width of the peak normalized to the position of the peak (half width/peak) and the homogeneity by the quotient d 25%/d 75%. The theoretically maximum possible homogeneity would accordingly be at a value of 1.0. The more closely this ratio approaches 1.0 the better, i.e. the more homogeneous the precipitated silica is.

The precipitated silica therefore has a half-height width of the peak normalized to the position of the peak (half width/peak) of =0.95, preferably =0.90, more preferably 0.50 to 0.90 and especially preferably 0.65 to 0.90.

In addition, the precipitated silica used has a homogeneity ratio d 25%/d 75% of 1.00 to 1.80, preferably 1.20 to 1.80, more preferably 1.30 to 1.80 and most preferably 1.40 to 1.75.

One important feature of the present invention is that, for homogeneous reinforcement, a fineness value $F.V._{(pressed)}$ within a range from 100 to 140 Å and preferably 100 to 130 Å is necessary.

This pore size range corresponds predominantly to the pore volume between the primary particles which have fused to form silica aggregates and allows a statement about their aggregation.

The relative width $Y_{(pressed)}$ of the silica used is very narrow, and so only slight variations between the particles are found. This is an essential prerequisite for homogeneous and uniform reinforcement and hence good abrasion performance. The relative width $Y_{(pressed)}$ of the pore size distribution is =2.8 (g nm)/ml, preferably in the range from 1.0 to 2.7 (g nm)/ml, more preferably from 1.3 to 2.6 (g nm)/ml and most preferably from 1.5 to 2.5 (g nm)/ml, and from 1.7 to 2.4 (g nm)/ml.

In a preferred embodiment, the precipitated silica used, as already explained above, is notable for a particularly high roughness of the surface and hence particularly good attachment of the coupling agent. The morphology index, 1M, of the precipitated silicas is 0.20 to 0.85, preferably 0.30 to 0.80, more preferably 0.40 to 0.80 and most preferably 0.50 to 0.80.

The mercury pore volume V1 corresponds to the pore volume of the pores having a diameter of <400 Å, which have a significant effect on the reinforcement. In the case of the precipitated silica used, it has been found that it is advantageous when a significant portion of this pore volume (V2) is formed by pores having a diameter of 175 to 275 Å. If this is the case and if, as described above, the relative width $Y_{(pressed)}$ of the pores and the fineness value $F.V._{pressed}$ are within the ranges specified herein, particularly good abrasion values have been found, such that the precipitated silica preferably has a pore volume ratio $V2/V1_{(pressed)}$ of 0.20 to 0.75, more preferably 0.25 to 0.6, most preferably 0.30 to 0.60 and especially preferably 0.3 to 0.55.

In a specific embodiment of the present invention, the precipitated silica used contains aluminum, the aluminum content in the form of $Al_2O_3$ being within the range of 0.1 to 5% by weight, preferably of 0.1 to 2% by weight, more preferably of 0.2 to 1% by weight and most preferably of 0.3 to 0.8% by weight. It has been found that, surprisingly, the increased aluminum content improves the crude mixture properties of a rubber mixture filled with such a precipitated silica. For instance, a low torque minimum in the MDR (vulcanization isotherm) test and a more rapid and therefore improved vulcanization performance are found. Thus, the advantages of the precipitated silica used with less than 0.1% by weight of $Al_2O_3$ can be supplemented with further advantages over prior art silicas by virtue of the $Al_2O_3$ addition.

The attachment capacity of the coupling agent can be improved even further when a sufficiently high number of silanol groups is present on the surface of the precipitated silica, since the silanol groups constitute the attachment sites for the coupling agent. In a further preferred embodiment, the precipitated silica therefore has a modified Sears number, Vol 2, of 13 to 30 ml/(5 g), preferably 15 to 29 ml/(5 g), more preferably 17 to 28 ml/(5 g) and most preferably 23 to 27 ml/(5 g).

The precipitated silica used may be present in various presentation forms, for example in the form of a powder with a particle size $d_{50}$ determined by means of laser diffraction of 1 to 80 μm. The pulverulent particles may have an irregular or else a regular outer form, i.e. they may, for example, also be essentially spherical. The precipitated silicas are preferably in the form of essentially spherical particles (microgranule) with a particle size $d_{50}$, determined by means of screen residue determination (Alpine), of 80 μm to 1000 μm. In the latter case, the precipitated silica is preferably prepared by means of spray tower drying, as described in EP 0937755, and exhibit an outer form characteristic of this drying method (see figures in EP 0937755).

More preferably, the precipitated silica is in the form of granules ($d_{50}$>1000 μm (Alpine screen residue)), and has, after granulation, such a particle size distribution that, by means of the screen residue determination (Ro-Tap), at least 80% by weight of the particles are larger than 300 μm and not more than 10% by weight are smaller than 75 μm. It has been found that, surprisingly, the presentation form as a granule is particularly suitable in order to preserve the effects obtained by virtue of the rough surface of the silica, such that it is not lost as a result of transport.

All preferred ranges specified can be established independently of one another.

The proportion of the precipitated silica used is preferably 1 to 300 phr, more preferably 1 to 250 phr and most preferably 1 to 200 phr.

The unit phr (parts per hundred parts of rubber by weight) used in this document is the unit of amount customary in the rubber industry for mixing formulations. The dosage of the parts by weight of the individual substances is based here on 100 parts by weight of the total mass of all solid rubbers present in the mixture.

In addition, the rubber mixture contains a coupling agent in amounts of 0.1-20 phr, preferably 0.5-15 phr, more preferably 1-10 phr. The coupling agent serves to improve processability and for attachment of the silica and of any other polar fillers present to the polar matrix, and reacts with the surface silanol groups of the silica or other polar groups during the mixing of the rubber or of the rubber mixture (in situ) or actually before the addition of the filler to the rubber in the manner of a pretreatment (premodification). The coupling agent employed is preferably silane, and it is possible to use all silane coupling agents known to those skilled in the art. It is additionally possible for 0-100 phr, preferably 0-80 phr, but at least 0.1 phr, especially at least 0.5 phr, of at least one carbon black to be present in the rubber mixture. It is possible to use all carbon black types used in the rubber industry.

It is additionally possible for other fillers to be present in the rubber mixture. The other fillers may, for example, be fibrous materials (natural or synthetic fibers), talc, chalk, ground rubber, metal oxides, various microgels or rubber gels and/or further carbonates or silicates or the like.

Further additives include essentially plasticizers, waxes, aging stabilizers, mastication aids and activators.

The proportion of the total amount of additives is 3 to 150 phr, preferably 3 to 100 phr, more preferably 5 to 80 phr.

The inventive rubber mixture further contains 0.1-100 phr, preferably 0.1-80 phr, of at least one plasticizer oil, which plasticizer oil is a mineral oil selected from the group consisting of DAE (distilled aromatic extracts) and/or RAE (residual aromatic extracts) and/or TDAE (treated distilled aromatic extracts) and/or MES (mild extracted solvents) and/or naphthenic oils.

It is also possible for 0-20 phr of at least one further additional plasticizer to be present in the rubber mixture. This further plasticizer may be a synthetic plasticizer and/or a fatty acid and/or a fatty acid derivative and/or a resin and/or a factice.

The inventive rubber mixture is produced by the processes customary in the rubber industry, in which a base mixture comprising all constituents apart from the vulcanization system (sulfur and vulcanization-influencing substances) is first produced in one or more mixing stages. Addition of the vulcanization system in a last mixing stage generates the finished mixture. The vulcanization of the finished rubber mixture is performed in the presence of sulfur or sulfur donors, and some sulfur donors can simultaneously act as vulcanization accelerants. Sulfur or sulfur donors are added to the rubber mixture in the last mixing step in amounts customary to the person skilled in the art (0.4 to 4 phr, sulfur preferably in amounts of 1.5 to 2.5 phr). The finished mixture is processed further, for example, by an extrusion operation and converted to the corresponding form. For use in motor vehicle tires, the mixture is preferably converted to the form of a tread and applied as known in the production of the green motor vehicle tire. However, the tread may also be wound onto a green tire in the form of a narrow strip of rubber mixture. It is unimportant for the tires whether the entire tread has been produced from a single mixture or has, for example, a cap and base structure, since it is important that at least the surface which comes into contact with the road surface has been produced from the inventive rubber mixture.

The invention will now be illustrated in detail with reference to comparative and inventive examples, but without being restricted to these examples. Table 2 shows both the mixture constituents and the corresponding physical properties of the rubber mixtures on the basis of test results on different specimens. The mixture examples starting with the letter C are comparative mixtures with commercially available precipitated silicas, and the mixture examples starting with the letter I inventive rubber mixtures containing precipitated silicas according to the disclosure herein.

Table 3 has the characteristics of the silicas used.

At the laboratory level, the mixture is produced by the above-described process in a tangential laboratory mixer. All mixtures were used to produce specimens by vulcanization, and these specimens were used to determine material properties typical of the rubber industry for the above-described tests on specimens, the following test methods were employed:

Shore A hardness at room temperature to DIN 53 505
Rebound elasticity at 70° C. to DIN 53 512
Stress at 300% elongation at room temperature to DIN 53 504
Grosch abrasion according to Grosch, K. A., the 131$^{st}$ ACS Rubber Div. Meeting, No. 97 (1987) and Grosch, K. A. et al., Kautschuk Gummi Kunststoffe, 50, 841 (1997).

The unit phr (parts per hundred parts of rubber by weight) used in this document is the unit of amount customary in the rubber industry for mixture formulations. The dosage of the parts by weight of the individual substances is based here on 100 parts by weight of the total mass of all solid rubbers present in the mixture.

As can be inferred from Table 3, the inventive rubber mixtures I1 to I5, with the same hardness, have a distinct improvement with regard to the abrasion performance. The abrasion advantage is even doubled in some cases; see I2 and I3. At the same time, the rolling resistance behavior, shown by the value for the rebound elasticity at 70° C., and the elongation behavior remain at a comparable level.

TABLE 2

| Constituents | Unit | C1 | C2 | I1 | I2 | I3 | I4 | I5 |
|---|---|---|---|---|---|---|---|---|
| Rubber matrix[a] | phr | 100 | 100 | 100 | 100 | 100 | 100 | 100 |
| Silica A[1] | phr | 92 | | | | | | |
| Silica B[2] | phr | | 92 | | | | | |
| Silica C | phr | | | 92 | | | | |
| Silica D | phr | | | | 92 | | | |
| Silica E | phr | | | | | 92 | | |
| Silica F | phr | | | | | | 92 | |
| Silica G | phr | | | | | | | 92 |
| Plasticizer[b] | phr | 24 | 24 | 24 | 24 | 24 | 24 | 24 |
| Aging stabilizer | phr | 6.5 | 6.5 | 6.5 | 6.5 | 6.5 | 6.5 | 6.5 |
| ZnO, stearic acid and processing aid | phr | 8 | 8 | 8 | 8 | 8 | 8 | 8 |
| Silane[c] | phr | 8 | 8 | 8 | 8 | 8 | 8 | 8 |
| Accelerator | phr | 4 | 4 | 4 | 4 | 4 | 4 | 4 |
| Sulfur | phr | 1.8 | 1.8 | 1.8 | 1.8 | 1.8 | 1.8 | 1.8 |
| Properties | | | | | | | | |
| Hardness at RT | Shore A | 61 | 61 | 61 | 61 | 61 | 61 | 61 |
| Rebound 70° C. | N/mm² | 36.9 | 36.5 | 36 | 36.8 | 37 | 36.4 | 37 |

TABLE 2-continued

| Constituents | Unit | C1 | C2 | I1 | I2 | I3 | I4 | I5 |
|---|---|---|---|---|---|---|---|---|
| Stress 300% | MPa | 4.9 | 5 | 5.2 | 5.2 | 5.3 | 5.4 | 5.3 |
| Abrasion (Grosch) | % | 100 | 130 | 190 | 200 | 200 | 195 | 180 |

[a]Composition of the rubber matrix: 17 phr NR (SMR 20, AC Regional Rubber), 43 phr BR (Buna CB 24, Lanxess) 40 phr SSBR (Budene 7076, Goodyear Chemicals)
[b]Plasticizer: TDAE
[c]Silane: Silquest A-1589 Silane, General Electric SP
[1]Ultrasil 7000 GR, Evonik Degussa GmbH
[2]Zeosil 1165 MP, Rhodia Deutschland GmbH

TABLE 3

| Property | Unit | A[1] | B[2] | C | D | E | F | G |
|---|---|---|---|---|---|---|---|---|
| BET | $m^2/g$ | 173 | 152 | 185 | 190 | 183 | 170 | 172 |
| CTAB | $m^2/g$ | 157 | 159 | 177 | 174 | 176 | 162 | 152 |
| DBP | g/(100 g) | 235 | 240 | 221 | 216 | 261 | 222 | 224 |
| Modified Sears number, Vol 2 | ml/(5 g) | 15.9 | 20.2 | 25.8 | 25.2 | 25.1 | 26.3 | 24.7 |
| CPS disk centrifuge | | | | | | | | |
| Half-height width/reflection | | 1.07 | 0.91 | 0.82 | 0.79 | 0.84 | 0.78 | 0.81 |
| d25%/d75% ratio | | 1.86 | 1.70 | 1.63 | 1.58 | 1.63 | 1.57 | 1.59 |
| Hg porosimetry with pressure pretreatment | | | | | | | | |
| Relative width $\gamma_{(pressed)}$ | nm g | 3.20 | 3.09 | 2.06 | 1.89 | 1.89 | 2.27 | 1.95 |
| V2/V1$_{(pressed)}$ | | 0.65 | 0.68 | 0.46 | 0.36 | 0.39 | 0.7 | 0.66 |
| Fineness value F.V.$_{(pressed)}$ | Å | 123 | 129 | 105 | 101 | 102 | 128 | 121 |
| Hg porosimetry with pressure pretreatment | | | | | | | | |
| Relative width $\gamma$ | nm g | 3.61 | 4.60 | 2.43 | 1.93 | 2.39 | 2.07 | 2.06 |
| V2/V1 | | 0.57 | 0.55 | 0.61 | 0.64 | 0.65 | 0.72 | 0.69 |
| Fineness value F.V. | Å | 145 | 148 | 119 | 119 | 130 | 137 | 134 |
| Morphology index (IM) (mean) | | 0.85 | 0.86 | 0.66 | 0.63 | 0.62 | 0.69 | 0.72 |

[1]Ultrasil 7000 GR, Evonik Degussa GmbH
[2]Zeosil 1165 MP, Rhodia Deutschland GmbH It is understood that the foregoing description is that of the preferred embodiments of the invention and that various changes and modifications may be made thereto without departing from the spirit and scope of the invention as defined in the appended claims.

What is claimed is:

1. A rubber mixture, comprising:
   at least one diene rubber and
   at least one precipitated silica with a CTAB surface area greater than or equal to 150 $m^2/g$ and a BET surface area greater than or equal to 150 $m^2/g$ and a DBP number between 180 and 350 g/100 g and a half-height width of the reflection normalized to the position of the reflection of less than or equal to 0.95 and a homogeneity ratio d 25% to d 75% of 1.00 to 1.80 and a relative width in the pressed state $Y_{pressed}$ of less than or equal to 2.8 (g nm)/ml and a fineness value F.V.$_{pressed}$ in the pressed state between 100 and 140 Å and
   further additives.

2. The rubber mixture as claimed in claim 1, wherein the precipitated silica has a morphology index IM of 0.20 to 0.85.

3. The rubber mixture as claimed in claim 1, wherein the precipitated silica in the pressed state has a pore volume ratio (V2/V1)$_{pressed}$ of 0.2 to 0.75.

4. The rubber mixture as claimed in claim 1, wherein the precipitated silica has an $Al_2O_3$ content of 0.1 to 5.0% by weight.

5. The rubber mixture as claimed in claim 1, wherein the precipitated silica has the fineness value in the pressed state F.V.$_{pressed}$ of 100 to 130 Å.

6. The rubber mixture as claimed in claim 1, wherein the precipitated silica in the pressed state has the relative width $Y_{pressed}$ of the pore size distribution of 1.5 to 2.5 (g nm)/ml.

7. The rubber mixture as claimed in claim 1, wherein the precipitated silica has the half-height width of the reflection normalized to the position of the reflection of 0.65 to 0.9.

8. The rubber mixture as claimed in claim 1, wherein the precipitated silica has the homogeneity ratio d 25% to d 75% of 1.20 to 1.80.

9. The rubber mixture as claimed in claim 1, wherein the precipitated silica has the homogeneity ratio d 25% to d 75% of 1.4 to 1.75.

10. The rubber mixture as claimed in claim 1, wherein the precipitated silica has the BET surface area of 160 to 210 $m^2/g$ and/or the CTAB surface area of 160 to 190 $m^2/g$ and/or the morphology index IM of 0.50 to 0.80 and/or a pore volume ratio V2/V1 (pressed) of 0.3 to 0.6 and/or an $Al_2O_3$ content of 0.1 to 2% by weight and/or a modified Sears number, Vol 2, of 23 to 27 ml/(5 g).

11. The rubber mixture as claimed in claim 1, wherein the precipitated silica is a granule with a particle size distribution configured such that, by means of the screen residue determination (Ro-Tap), at least 80% by weight of the particles are larger than 300 μm and not more than 10% by weight are smaller than 75 μm or a powder with a mean particle size $d_{50}$ determined by means of laser diffraction of 15 to 80 μm, or spherical particles with a particle size $d_{50}$ determined by means of screen residue determination (Alpine) of 80 μm to 1000 μm.

12. The rubber mixture as claimed in claim 1, wherein the proportion of the precipitated silica is 1 to 300 phr.

13. The rubber mixture as claimed in claim 1, wherein the precipitated silica is attached to the polymer matrix by a coupling agent.

14. The rubber mixture as claimed in claim 13, wherein the amount of the coupling agent is 0.1-20 phr.

15. The rubber mixture as claimed in claim 1, further comprising 0 to 100 phr of at least one carbon black.

16. The rubber mixture as claimed in claim 1, wherein the proportion of further additives is 3-150 phr.

17. The method of producing a tire comprising preparing the rubber mixture according to claim 1.

18. The method as claimed in claim 17 for producing the tread of a tire.

19. The method as claimed in claim 17 for producing a body mixture of a tire, comprising sidewall, inner liner, apex, belt, shoulder, belt profile, squeegee, carcass, bead reinforcer and/or bandage.

20. The method of producing a belt and/or a drive belt comprising preparing the rubber mixture as claimed in claim 1.

* * * * *

UNITED STATES PATENT AND TRADEMARK OFFICE
CERTIFICATE OF CORRECTION

PATENT NO. : 8,481,633 B2
APPLICATION NO. : 12/923744
DATED : July 9, 2013
INVENTOR(S) : Carmen Schmidt et al.

It is certified that error appears in the above-identified patent and that said Letters Patent is hereby corrected as shown below:

In the Specification

In Column 2:
Line 12: delete "components are" and substitute -- components. The rubber mixtures for the further tire components -- therefor.

In Column 17:
Line 49: delete "1M" and substitute -- IM -- therefor.

In Column 20:
Line 21: delete "industry for" and substitute -- industry. For -- therefor.

Signed and Sealed this
Twentieth Day of August, 2013

Teresa Stanek Rea
*Acting Director of the United States Patent and Trademark Office*